United States Patent Office 3,823,088
Patented July 9, 1974

3,823,088
POLLUTED WATER PURIFICATION
E. O. Box, Jr., and Floyd Farha, Jr., Bartlesville, Okla., assignors to Phillips Petroleum Company
No Drawing. Continuation-in-part of abandoned application Ser. No. 255,152, May 19, 1972. This application Mar. 2, 1973, Ser. No. 337,406
Int. Cl. C02b 1/34
U.S. Cl. 210—63                                                15 Claims

ABSTRACT OF THE DISCLOSURE

Organically polluted waters are purified by contacting with a catalyst comprising zinc aluminate promoted with at least one metal active for initiating oxidative reactions in the liquid or gaseous phase under oxidizing conditions. In one embodiment, an aqueous stream obtained from the effluent of an oxidative dehydrogenation containing contaminating oxygen-containing organic materials is subjected to oxidizing conditions in the presence of a promoted zinc aluminate catalyst to convert the water to a potable aqueous product.

---

This application is a continuation-in-part application of our copending application, Ser. No. 255,152, filed May 19, 1972 and now abandoned, entitled "Polluted Water Purification and Catalyst."

This invention relates to a process for purification of organically polluted waters. In accordance with another aspect, this invention relates to a process for converting organic contaminated aqueous streams to fresh potable water by oxidation in the presence of a promoted zinc aluminate catalyst. In accordance with another aspect, this invention relates to a continuous process for the abatement of water pollution by removing oxidizable organic wastes from aqueous streams by oxidizing these compounds in either gaseous or liquid phase in the presence of a promoted zinc aluminate catalyst.

The problem of disposing of waste-containing waters has, in recent years, become more acute due to increasing population and increasing industrial activity. This particularly is true of waters which are polluted by the presence of organic materials such as waters discharged in a chemical process. Frequently, such waste waters contain organic materials in concentrations far too low for them to be conveniently or economically recoverable, yet in concentrations so high that it is impractical and undesirable to simply pump the waste water into available streams, rivers, lakes, or ponds.

In a recent developed process known as oxidative dehydrogenation and particularly butene dehydrogenation process, an oxygen-containing gas is fed to the catalytic reaction zone containing a catalyst such as stannic phosphate along with the butene feed and steam, and a substantial portion of the hydrogen produced by dehydrogenation is combusted to water vapor. This not only removes the inhibiting effect of the hydrogen on further dehydrogenation, but also supplies heat to this endothermic reaction resulting in high conversions and per-pass yield of butadiene at relatively good selectivity. By this method, additional steam is produced which is recovered from the process effluent as condensate. Also, moderate concentrations of oxygenated hydrocarbons are generated which similarly appear in the condensed steam and/or in the hydrocarbon effluent.

The oxygen used in the dehydrogenation is present in an excess in order to insure complete conversion of hydrogen released in the dehydrogenation reaction. Therefore, the effluent from the dehydrogenation reaction will contain unreacted oxygen gas as well as a number of oxygenated products of the reaction. This residual oxygen and the oxygenated compounds are corrosive and are subject to polymerization and are therefore detrimental to the further processing of the hydrocarbon product. It is therefore necessary that the oxygen and oxygen-containing compounds be removed from the effluent streams.

It has been found that a small percentage of the olefin feed is converted to oxygenated hydrocarbons such as furan, alcohols, acids, aldehydes, ketones, etc., the nature and quantity of these compounds depending upon the conditions under which the dehydrogenation is effected. Under normal plant operating conditions, these oxygenated by-products will be ultimately fed into the atmosphere and/or discharged with waste water and/or end up in a heavy hydrocarbon-containing fraction, depending upon the separation and recovery processes employed and their operating conditions.

Some processes are known in which such organic-containing waste waters can be subjected to air-oxidation under elevated temperatures. Such air-oxidation converts most or all of the organic matter into harmless materials such as carbon dioxide or water vapor. This reaction is sometimes carried out in the presence of catalysts to promote the oxidation and to allow the reaction to be carried out under less severe conditions.

Although a number of catalysts and catalytic processes are known to carry out such air-oxidations, not all catalysts which have activity for promoting oxidation have been found to be suitable. The conditions under which small amounts of organic wastes are oxidized in the presence of large amounts of water are relatively severe. The present invention provides an alternative catalyst and process to achieve this purpose. The outstanding feature of the invention is the activity and durability of the catalyst system.

Accordingly, an object of this invention is to provide an improved process for the purification of organically polluted water.

Another object of this invention is to provide a process for the purification of water streams containing oxygen-containing compounds.

Other objects and aspects, as well as the several advantages of the invention, will be apparent to those skilled in the art upon reading the specification and the appended claims.

In accordance with the invention set forth in said copending application, a process is provided for converting water contaminated with organic materials to a potable aqueous product by contacting contaminated water under oxidation conditions with a zinc aluminate catalyst promoted with at least one metal active for initiating oxidative reactions.

More specifically as set forth in said copending application, the invention concerns a process for continuously converting organic contaminated aqueous streams to fresh potable water by contacting either in the liquid phase or gaseous phase an aqueous stream so contaminated with a zinc aluminate catalyst promoted with at least one metal active for initiating oxidative reactions under conditions so as to produce water essentially free of pollutants.

It has been further found according to said copending application that zinc aluminate promoted with at least two metals active for initiating oxidative reactions results in a catalyst particularly effective for rendering water contaminated with organic materials to a potable aqueous product.

In accordance with the invention, it has been further found that the activity and life of metal promoted zinc aluminate oxidation catalysts for the removal of organics from aqueous streams can be increased by incorporating a rare earth metal in the catalyst system.

More specifically, it has been found that the activity of a zinc aluminate catalyst promoted with a Group IB metal and a Group VIIB metal can be increased and catalyst lifetime extended by including a promoting amount of at least one cerium group rare earth metal such as lanthanum and cerium with the catalyst system.

Thus, it has been found that the activity is increased for catalysts comprising zinc aluminate promoted with at least two metals from different groups of the Periodic Table by incorporating therein a promoting amount of a cerium group rare earth metal. It has also been observed that such catalysts exhibit extended catalyst life and improved catalyst stability in that little, if any, promoting metal is lost during actual use. Zinc aluminate promoted with three metals including a rare earth metal are especially durable and active.

The catalyst used in the present invention is zinc aluminate, preferably promoted with a small amount of a metal active for initiating oxidative reactions. Such metals can be found in Groups IIIB, IVB, VB, VIB, VIIB, VIII, IB, and VA of the Periodic Table. For example, active and durable catalysts are obtained by promoting zinc aluminate with minor amounts of metals such as copper, manganese, nickel, cobalt, bismuth, rare earths, especially the cerium group rare earth metals such as lanthanum and cerium, platinum, palladium, rhenium, iridium, and the like, and combinations of these.

Particularly effective catalyst compositions that have been prepared include Cu-zinc aluminate, Ni-zinc aluminate, Cu-Ni-zinc aluminate, Cu-Mn-zinc aluminate, Bi-zinc aluminate, Ce-zinc aluminate, Pt-zinc aluminate, Pd-zinc aluminate, Cu-Pt-zinc aluminate, Ir-zinc aluminate, Re-zinc aluminate, and La-Cu-Mn-zinc aluminate.

The catalysts are prepared using conventional catalyst preparation methods. The promoter metals are preferably incorporated into the zinc aluminate support material by impregnation with aqueous solutions of soluble compounds of the promoter metals. These promoter metal compounds are preferably those compounds which are convertible to the metal or to the oxide of the metal on calcination, that is, they contain essentially no other elements which are not volatilizable during the calcination step. The concentration of promoter metal on the zinc aluminate, after calcination, will generally be in the range of 0.05–20 weight percent, preferably 0.1–10 weight percent, calculated as the metal and based upon the weight of the zinc aluminate support material.

The zinc aluminate can be prepared using any conventional method of preparation which will provide a solid material having a surface area of at least about one square meter per gram. One particularly suitable method is to intimately blend a mixture of aluminum oxide and zinc oxide, in essentially stoichiometric proportions, followed by a calcination step wherein the mixture is heated in air at temperatures of 1500–2200° F. Prior to the calcination, the mixture can be formed into conventional catalyst shapes such as pellets, extrudates, agglomerates, and the like. Some or all of the zinc aluminate can be in the spinel form.

Optionally, the zinc aluminate support material can contain up to about 5 weight percent of tin, calculated as the metal, based upon the zinc aluminate. Although tin is not in the class of promoter metals in that it substantially promotes the activity of the catalyst, it has been found to be compatible with the catalyst and can possibly contribute to the durability of the catalyst.

The aqueous wastes which are applicable as feeds for the process of the present invention are those which contain minor amounts of dissolved and/or suspended organic materials. The process is particularly applicable for feeds in which the organic materials are hydrocarbons and/or oxygenated hydrocarbons. The organic materials can be present in the predominantly aqueous stream in a broad range of concentrations, but will ordinarily be present in amounts less than about 10 weight percent. It is generally more convenient to characterize the aqueous feeds by the total carbon content. Consequently, such feeds can contain from about 10 to about 100,000 p.p.m. carbon, more frequently 25 to about 10,000 p.p.m. carbon, still more frequently 100–5,000 p.p.m. carbon.

Such aqueous waste streams can be derived from any source such as chemical or biological sources. For best results, the aqueous waste streams will contain relatively little non-volatile and/or non-oxidizable inorganic materials.

The process of the present invention can be carried out under a variety of conditions depending on the feedstock, catalyst, the desired degree of organic removal, and whether a liquid phase or vapor phase operation is desired. The reaction can be carried out in any suitable apparatus and can be carried out either batchwise or continuously. Continuous operation through a fixed catalyst bed is presently preferred such as downflow operation through a vertically positioned fixed catalyst bed. However, other modes of reaction can be used.

In liquid phase operation, the temperature within the reaction zone will generally be 350–550° F., preferably 400–500° F., and under a sufficient pressure to maintain a liquid phase within the reaction zone. For purposes of economy, substantially only that pressure necessary to maintain the liquid phase is used, although pressures of up to 2,000 p.s.i.g. can be used. It will be understood, however, that even in this liquid phase type of operation, there will be a substantial vapor phase present in addition to the liquid phase. This is because of the air which is used as the oxidant and because of the gaseous products of oxidation. In the liquid phase mode of operation, the molar ratio of water to air in the reaction zone will be in the range of 10:1 to 200:1, preferably 25:1 to 50:1. The water feed will generally pass through the reaction zone at a rate of 0.1–10, preferably 2–5, LHSV.

In vapor phase operation, the temperatures can be 600–1200° F., preferably 900–1000° F., and at any convenient pressure which will permit operation in the vapor phase. Generally, pressures from atmospheric to about 100 p.s.i.g. will be used. The molar ratio of feed water to air will be 10:1–200:1, preferably 80:1–150:1. The feed water rate can be in the range of 0.1–50, preferably 20–40, LHSV.

It can be seen from the above that, in vapor phase operation which utilizes higher temperatures, much higher space rates can be utilized. Nevertheless, because vapor phase operation requires the vaporization of relatively large quantities of water, it is presently preferred to operate under liquid phase conditions.

The catalysts utilized in the process of the present invention are active and relatively long-lived. However, under the extreme conditions which are typical of the process, some of the promoter metal may be slowly lost from the catalyst. However, such minor losses will ordinarily influence the effectiveness of the catalyst but little. If, however, over long periods of time the catalyst does lose a substantial portion of its activity, the activity of the catalyst can be improved either by a calcination in air or by a reimpregnation with an additional quantity of promoter metal followed by a calcination in air.

EXAMPLE I

Preparation of Zinc Aluminate

A 1700 g. quantity of finely divided commercial flame-hydrolyzed alumina (Alon Alumina—Cabot Corp.) was slurried with 7 liters of distilled water. A 1450 g. quantity of finely divided zinc oxide was then added and the resulting slurry was ball-milled for one hour. The slurry was poured into shallow pans and dried overnight at 275° F. in a forced draft oven. The dried cake was broken up and screened into 40-mesh particles (3025 g.) and mixed with 182 g. of ployethylene powder (tableting lubricant) in a mill, and formed into ⅛ x ⅛ inch tablets in a tableting machine. The tablets were then calcined by a heating sequence which included one hour at 800° F., one hour at 1000° F., one hour at 1100° F., and three hours at 1800° F. The tablets were broken up and screened to 14/20 mesh size granules prior to impregnation with the promoter metals.

Several variations of the above-described procedure were carried out in which minor amounts of tin were incorporated into the zinc aluminate. This was done using the same procedure except that minor amounts of tin oxide powder were added to the initial aqueous slurry of alumina and zinc oxide. Sufficient tin oxide was added to provide zinc aluminate compositions which contained, after calcination, 0.4, 1 and 4 weight percent tin calculated as the metal and based on the zinc aluminate.

fins, naphthenes, aromatics, as well as various oxygenated materials such as acids, aldehydes, ketones, alcohols, ethers, and the like.

The catalysts were charged into tubular fixed reactors which were vertically positioned. A mixture of air and waste water was continuously and downwardly passed through the reactor. Depending upon the conditions of temperature and pressure, some reactions were vapor phase while others maintained a liquid phase in the reaction zone.

After a period of time on stream, the effluent of the reaction zone was sampled and analyzed for residual organic content in terms of p.p.m. carbon. The essential conditions as well as the results of these tests are shown in Tables I and II which follow.

TABLE I.—VAPOR PHASE CATALYTIC AIR-OXIDATION OF AQUEOUS WASTES OVER METAL-PROMOTED ZINC ALUMINATE CATALYSTS

| Run no. | Weight percent promoter metal | Temperature, °F | Pressure, p.s.i.g. | Water: air, mole ratio | Water rate, LHSV | Hours on stream | Carbon in feed, p.p.m. | Carbon removal, percent |
|---|---|---|---|---|---|---|---|---|
| 1 | 2 Cu | 1,005 | 35 | 18:1 | 17.5 | 4.5 | 810 | 99.4 |
| 2 | 2 Cu | 992 | 45 | 58:1 | 61.5 | 9.9 | 810 | 97.5 |
| 3 | 2 Ni | 1,002 | 35 | 42:1 | 42.5 | 2.1 | 810 | 97.2 |
| 4 | 1 Cu-1 Ni | 1,016 | 35 | 31:1 | 42.5 | 20.6 | 760 | 99.2 |
| 5 | 1 Mn-1 Cu | 1,000 | 35 | 137:1 | 53.4 | 5.5 | 760 | 95.4 |
| 6 | 2 Bi | 1,006 | 40 | 21:1 | 35.8 | 4.1 | 760 | 98.7 |
| 7 | 2 Ce | 1,004 | 35 | 7:1 | 14.2 | 2.6 | 760 | 89.8 |
| 8 [a] | None | 1,006 | 35 | 8:1 | 7.7 | 29 | 800 | 97.6 |
| 9 [b] | 0.4 Pt | 1,002 | 36 | 10:1 | 28.3 | 26.5 | 800 | 99.0 |
| 10 [b] | 0.4 Pt | 1,000 | 160 | 137:1 | 30.8 | 31.1 | 800 | 99.3 |

[a] 1 wt. percent Sn had been incorporated into the zinc aluminate during its preparation.
[b] 0.4 wt. percent Sn had been incorporated into the zinc aluminate prior to impregnation with Pt.

TABLE II—LIQUID PHASE CATALYTIC AIR-OXIDATION OF AQUEOUS WASTES OVER METAL-PROMOTED ZINC ALUMINATE CATALYSTS

| Run no. | Weight percent promoter metal | Temperature, °F | Pressure, p.s.i.g. | Water: air, mole ratio | Water rate, LHSV | Hours on stream | Carbon in feed, p.p.m. | Carbon removal, percent |
|---|---|---|---|---|---|---|---|---|
| 11 | 1 Cu-1 Ni | 398 | 275 | 14:1 | 5.1 | 23.2 | 760 | 45.7 |
| 12 | 2 Bi | 407 | 310 | 9:1 | 7.5 | 24.5 | 760 | 52.6 |
| 13 | 4 Cu-0.1 Pt | 484 | 690 | 12:1 | 1.6 | 53.7 | 1,053 | 93.7 |
| 14 | 0.4 Pd | 477 | 665 | 19:1 | 1.9 | 4.5 | 1,053 | 89.5 |
| 15 | 0.4 Ir | 489 | 690 | 32:1 | 1.2 | 22.5 | 1,053 | 96.8 |
| 16 | 0.4 Re | 487 | 675 | 29:1 | 1.2 | 23.0 | 1,053 | 69.5 |
| 17 [c] | None | 484 | 670 | 38:1 | 2.4 | 21 | 1,053 | 71.9 |
| 18 [d] | 4 Cu-2 Mn | 490 | 660 | 11:1 | 1.2 | 16.6 | 2,000 | 97.7 |
| 19 | 4 Cu-2 Mn | 488 | 670 | 32:1 | 1.9 | 407 | 890 | 85.7 |
| 20 [e] | 4 Cu-2 Mn | 490 | 670 | ~25:1 | ~2 | ~3 | 890 | ([f]) |
| 21 [e,g] | 4 Cu-2 Mn | 490 | 690 | 26:1 | 2.3 | 11.7 | 890 | 59.1 |

[c] 4 weight percent Sn had been incorporated during its preparation.
[d] The zinc aluminate had surface area of 35 m.²/g. All others had about 6 m.²/g.
[e] A commercial alumina (Kaiser) catalyst material used in this run instead of zinc aluminate.
[f] Run was shut down after 3 hours due to disintegration of catalyst into a paste.
[g] Repeat of Run 20 except that, on startup, the reactor was pressured up with both air and water simultaneously.

EXAMPLE II

Preparation of Metal-Promoted Zinc Aluminate Catalysts

A 38 g. quantity of zinc aluminate prepared as in Example I was impregnated with an aqueous solution of palladium dichloride. A 14.2 cc. quantity of a PdCl$_2$ solution containing 0.0107 g. Pd/cc. was diluted to 25 cc. with distilled water. The zinc aluminate granules were soaked with this solution until essentially all the liquid was absorbed. The impregnated granules were then dried at 248° F., calcined in air at 1100° F.

Other zinc aluminate catalysts were impregnated with water soluble compounds of the promoting metals in a similar fashion to prepare active zinc aluminate catalysts promoted with copper, nickel, manganese, bismuth, cerium, platinum, iridium, rhenium, and combinations of these.

EXAMPLE III

Air-Oxidation of Aqueous Wastes

Catalysts prepared in Example II were used to oxidize aqueous solutions of organic wastes. These aqueous solutions were obtained from process water associated with the catalytic oxidative dehydrogenation of butenes to butadiene. The water contained various amounts of dissolved and suspended by-products such as paraffins, ole- Invention runs 1–19 in Tables I and II show that the catalysts of the invention process are highly effective for the removal of organic matter from aqueous streams by air oxidation. By varying conditions such as feed rate, temperature, pressure, and water:air ratios, the desired level of residual organic level can be achieved up to and including essentially complete organic removal.

In every run, the catalysts were found to be physically durable and long lasting. For example, the catalyst of Run 19 showed good results after 407 hours on stream.

Runs 8 and 17 show that zinc aluminate containing small amounts of tin, but otherwise unpromoted, shows substantial activity and durability for the reaction.

Comparison runs 20 and 21 show that a similarly metal-promoted alumina catalyst has neither the activity nor, more importantly, the durability for this severe service. In Run 20, which was the first attempt to use the alumina-supported catalyst, the catalyst failed presumably because it was unable to survive the initial shock of startup. The run was started by pressuring up the heated reactor with air, then introducing the water at about 300 p.s.i.g. In run 21 a milder startup was used in which the heated reactor was pressured with both air and water simultaneously. The procedure allowed the catalyst to operate but its activity was less than that of the similar zinc aluminate catalysts of Runs 18 and 19. The durable zinc aluminate catalysts do not exhibit the sensitivity to startup procedures as did the alumina catalyst.

EXAMPLE IV

Catalysts were evaluated in a continuous automated test unit at 700 p.s.i.g., 4 LHSV water containing 1000 p.p.m. dissolved organic carbon, and 20/1 water to air mole ratio. Both catalysts comprised 4 percent copper and 2 percent manganese on zinc aluminate. To one of these was added 1 percent lanthanum by impregnation with lanthanum nitrate solution. The percent of organics removal is tabulated after several hours on stream.

TABLE III

| Time on stream | 450° F., percent at— | | 490° F., percent at— | |
|---|---|---|---|---|
| | 1% La | No La | 1% La | No La |
| Hours: | | | | |
| 46 | 80 | 74 | | |
| 73 | | | 91 | 86 |
| 121 | 75 | 62 | | |
| 216 | | | 93 | 78 |
| 269 | 76 | 51 | | |
| 294 | | | 90 | 78 |
| 345 | 59 | 49 | | |

EXAMPLE V

Catalysts similar to those of Example IV were evaluated in life tests using butene O-X-D reboiler blowdown water as feed. A laboratory scale 25 cc. stainless steel reactor was employed in a downflow trickle-bed mode. The organics removal was determined from the residual carbon content or the total oxygen demand (TOD) of the treated water.

Table IV is a summary of a life test using a catalyst comprising 4% copper, 2% manganese, and 1% lanthanum on zinc aluminate. All three were put on the base by impregnation from aqueous solutions of the metal nitrates.

TABLE IV
Life test of 4 Cu-2 Mn-1 La-zinc aluminate

| Temperature, °F | 478 | 475 | 474 | 481 | 483 | 482 | 484 |
|---|---|---|---|---|---|---|---|
| Pressure, p.s.i.g | 670 | 670 | 670 | 670 | 675 | 675 | 675 |
| H₂O/air, mole ratio | 29.4 | 28.9 | 16.2 | 27.2 | 20.3 | 18.2 | 20.0 |
| H₂O, LHSV | 2.6 | 4.0 | 4.0 | 2.6 | 2.7 | 2.7 | 2.7 |
| Hours on stream | 22 | 119 | 287 | 268 | 685 | 775 | 966 |
| Volumes treated | 57 | 345 | 954 | 1,469 | 2,042 | 2,201 | 2,713 |
| Product quality: | | | | | | | |
| Residual carbon, p.p.m | 32 | 128 | 99 | 66 | | 62 | ¹ 62 |
| Percent C removal | 99.6 | 85.3 | 88.6 | 92.5 | | 93.0 | 93.0 |
| TOD | 72 | 327 | 310 | 170 | 215 | 131 | 107 |
| Percent reduction TOD | 96.0 | 81.9 | 85.9 | 92.2 | 90.2 | 94.0 | 95.1 |
| pH | 6.1 | 4.5 | 4.7 | 6.8 | 5.7 | 6.5 | |
| Carbonyl | Nil | Nil | Nil | Nil | Nil | Nil | Nil |
| Metals, p.p.m.: | | | | | | | |
| Cu | 0.12 | | 0.06 | | | | <0.02 |
| La | 0.49 | | 0.32 | | | | <1.49 |
| Mn | 0.01 | | 0.01 | | | | <0.02 |
| Zn | 0.23 | | 0.06 | | | | (²) |
| Reboiler blowdown feed water: | | | | | | | |
| Carbon, p.p.m | 868 | | | | 889 | | |
| TOD | 2,100 | | | | 2,190 | | |
| pH | 2.9 | | | | 2.9 | | |
| Carbonyl, p.p.m | 560 | | | | 630 | | |

¹ Based on comparison of CO₂ recovery. Firm analtyical results incomplete.
² Not determined.

These data show that with lanthanum present there is less loss of metals in the treated water and there is a higher fraction of organic contaminant oxidized.

Table V shows data from a run under similar conditions with a catalyst not containing lanthanum, but prepared in the same manner as described above.

TABLE V
4% copper—2% manganese—Zinc aluminate

| Temperature, °F | 479 | 481 | 480 |
|---|---|---|---|
| Pressure, p.s.i.g | 670 | 675 | 675 |
| H₂O/air, mole ratio | 14.8 | 17.2 | 18.2 |
| H₂O, LHSV | 2.33 | 2.44 | 2.54 |
| Hours on stream | 21.5 | 51 | 166 |
| Volumes treated | 55 | 128 | 670 |
| Product quality: | | | |
| Residual carbon, p.p.m | | 105 | 109 |
| Percent C removal | | 89.1 | 83.5 |
| TOD | 245 | | |
| Percent reduction TOD | 86.5 | | |
| pH | 2.9 | 3.5 | 3.8 |
| Carbonyl, p.p.m | 630 | | |
| Metals, p.p.m.: | | | |
| Cu | 0.45 | 0.15 | 0.30 |
| Mn | 0.49 | 0.12 | 0.08 |
| Zn | | 0.13 | |
| Reboiler blowdown feed water: | | | |
| Carbon, p.p.m | 960 | | 661 |
| TOD | 1,815 | | 2,280 |
| pH | 2.9 | | 2.8 |
| Carbonyl, p.p.m | 630 | | 510 |

EXAMPLE VI

The life test of the four percent copper-two percent manganese-one percent lanthanum on zinc aluminate catalyst of Example V was extended to 1686 hours. The catalyst was used to treat organically containing reboiler blowdown water and after 1686 hours and 4680 volumes of reboiler blowdown water had been treated, the organics removal rate remained at 92–93 percent, the same level as was observed at 774 hours. This level of conversion was obtained at 485–490° F., 670 p.s.i.g., 18/1 mole ratio of water to air, and at 2.8 LHSV water feed. The conversion drops to 88–90 percent if the water to air ratio is increased to about 24/1.

At 1350 hours (3778 volumes water/volume of catalyst) the concentrations of metals leached from the catalyst and appearing in the treated water were:

Copper ----------------------------- p.p.b. <21
Lanthanum ------------------------- p.p.m. <0.49
Manganese ------------------------- p.p.b. <6.5
Zinc -------------------------------- p.p.b. <3.1

Based on these values, an extrapolation would indicate that 6–8 years of continuous operation would remove about 25 percent of the metals on the catalyst.

Table VI is a summary of the life test.

TABLE VI
Life test of 4 Cu-2 Mn-1 La-zinc aluminate

| Temperature, °F | 478 | 483 | 491 | 488 | 492 |
|---|---|---|---|---|---|
| Pressure, p.s.i.g | 670 | 675 | 670 | 675 | 675 |
| H₂O/air mole ratio | 29.4 | 18.5 | 23.1 | 17.6 | 20.3 |
| H₂O, LHSV | 2.6 | 2.7 | 2.76 | 2.80 | 2.24 |
| Hours on stream | 22 | 799 | 1,182 | 1,614 | ¹ 1,686 |
| Volumes treated | 57 | 2,271 | 3,308 | 4,513 | 4,680 |
| Product quality: | | | | | |
| Residual carbon, p.p.m | 32 | 62 | 86 | 66 | |
| Percent C removal | 99.6 | 93 | 88.7 | 92.5 | |
| TOD | 72 | 131 | | 125 | |
| Percent reduction TOD | 96.0 | 94 | | 93.5 | |
| pH | 6.1 | 6.5 | 4.3 | | |
| Carbonyl, p.p.m | Nil | Nil | Nil | | |
| Metals, p.p.m.: | | | | | |
| Cu | 0.12 | <0.02 | <0.04 | | |
| La | <0.49 | <0.49 | <0.49 | | |
| Mn | 0.01 | <0.02 | <0.01 | | |
| Zn | 0.23 | 0.45 | <0.03 | | |
| Reboiler blowdown feed water: | | | | | |
| Carbon, p.p.m | 868 | 880 | 762 | | |
| TOD | 2,100 | 2,190 | 1,980 | 2,001 | |
| pH | 2.9 | 2.9 | 2.8 | 3.3 | |
| Carbonyl, p.p.m | 560 | 630 | 390 | 390 | |

¹ Test is continuing, analyses incomplete.

We claim:

1. A process for the purification of aqueous streams containing as impurities dissolved and/or suspended oxidizable pollutants therein, which process comprises contacting an aqueous stream containing oxidizable organic pollutant impurities and an oxygen-containing gas with a catalyst cosisting essentially of zinc aluminate promoted with 0.05–20 weight percent of (1) at least two different metals active for initiating oxidative reactions selected from the group consisting of the metals of Groups IIIB, IVB, VB, VIB, VIIB, VIII, IB and VA of the Periodic Table and (2) a rare earth metal under liquid phase oxidation conditions including a temperature in the range 350–550° F. and a molar ratio of water to oxygen in the range 10:1 to 200:1 to convert said organic materials to innocuous materials so that said aqueous stream which has been substantially freed of said contaminating impurities can be safely discarded or reused.

2. A process according to claim 1 wherein said aqueous stream contains hydrocarbons and oxygen-containing hydrocarbon compounds and is obtained from the effluent from an oxidative dehydrogenation process and said zinc aluminate contains up to 5 weight percent tin.

3. A process according to claim 1 wherein the oxygen-containing gas is air and zinc aluminate is promoted with (1) at least one of copper, nickel, manganese, bismuth, platinum, palladium, iridium, and rhenium, and (2) a rare earth metal selected from cerium and lanthanum.

4. A process according to claim 1 wherein the oxygen-containing gas is air and zinc aluminate is promoted with a Group IB metal, a Group VIII metal and a rare earth metal selected from cerium and lanthanum.

5. A process according to claim 1 wherein the oxygen-containing gas is air and zinc aluminate is promoted with a Group IB metal, a Group VA metal and a rare earth metal selected from cerium and lanthanum.

6. A process for the purification of aqueous streams containing as impurities dissolved and/or suspended oxidizable pollutants therein, which process comprises contacting an aqueous stream containing oxidizable organic pollutant impurities and an oxygen-containing gas with a catalyst cosisting essentially of zinc aluminate promoted with 0.05–20 weight percent of a Group IB metal, a Group VIIB metal, and a rare earth metal under liquid phase oxidation conditions including a temperature in the range 350–550° F. and a molar ratio of water to oxygen in the range 10:1 to 200:1 to convert said organic materials to innocuous materials so that said aqueous stream which has been substantially freed of said contaminating impurities can be safely discarded or reused.

7. A process according to claim 6 wherein said rare earth metal is lanthanum.

8. A process according to claim 6 wherein said oxygen-containing gas is air.

9. A process for the purification of aqueous streams containing as impurities dissolved and/or suspended oxidizable pollutants therein, which process comprises contacting an aqueous stream containing oxidizable organic pollutant impurities and an oxygen-containing gas with a catalyst consisting essentially of zinc aluminate promoted with 0.05–20 weight percent of a Group IB metal, a Group VIIB metal, and a rare earth metal under vapor phase oxidation conditions including a temperature in the range 600–1,200° F. and a molar ratio of water to oxygen in the range 10:1 to 200:1 to convert said organic materials to innocuous materials so that said aqueous stream which has been substantially freed of said contaminating impurities can be safely discarded or reused.

10. A process according to claim 9 wherein said rare earth metal is lanthanum.

11. A process according to claim 9 wherein said oxygen-containing gas is air.

12. A process for the purification of aqueous streams containing as impurities dissolved and/or suspended oxidizable pollutants therein, which process comprises contacting an aqueous stream containing oxidizable organic pollutant impurities and an oxygen-containing gas with a catalyst consisting essentially of zinc aluminate promoted with 0.05–20 weight percent of (1) at least two different metals active for initiating oxidative reactions selected from the group consisting of the metals of Groups IIIB, IVB, VB, VIB, VIIB, VIII, IB, and VA of the Periodic Table and (2) a rare earth metal under vapor phase oxidation conditions including a temperature in the range 600–1,200° F. and a molar ratio of water to oxygen in the range 10:1 to 200:1 to convert said organic materials to innocuous materials so that said aqueous stream which has been substantially freed of said contaminating impurities can be safely discarded or reused.

13. A process according to claim 12 wherein the oxygen-containing gas is air and zinc aluminate is promoted with (1) at least one of copper, nickel, manganese, bismuth, platinum, palladium, iridium, and rhenium, and (2) a rare earth metal selected from cerium and lanthanum.

14. A process according to claim 12 wherein the oxygen-containing gas is air and zinc aluminate is promoted with a Group IB metal, a Group VIII metal and a rare earth metal selected from cerium and lanthanum.

15. A process according to claim 12 wherein the oxygen-containing gas is air and zinc aluminate is promoted with a Group IB metal, a Group VA metal and a rare earth metal selected from cerium and lanthanum.

References Cited
UNITED STATES PATENTS

| | | | |
|---|---|---|---|
| 2,699,425 | 9/1954 | Moses et al. | 210—63 |
| 2,944,396 | 7/1960 | Barton et al. | 210—63 |
| 3,168,587 | 2/1965 | Michaels et al. | 260—683.3 |
| 3,207,808 | 9/1965 | Bajars | 252—462 |
| 3,692,701 | 9/1972 | Box | 252—463 |

CHARLES N. HART, Primary Examiner

B. CASTEL, Assistant Examiner